United States Patent
Nordstrom

[15] 3,656,780
[45] Apr. 18, 1972

[54] TRANSPORT OF TRACK-LAYING VEHICLES

[72] Inventor: Carl Gustaf Nordstrom, Klammerdammsgatan 13, S-302, 42 Halmstad, Sweden

[22] Filed: Nov. 5, 1969

[21] Appl. No.: 874,350

[30] Foreign Application Priority Data

Nov. 7, 1968 Sweden...............................15085/68
Oct. 13, 1969 Sweden...............................14013/69

[52] U.S. Cl. .......................280/415 R, 214/138, 280/415 B
[51] Int. Cl. .....................................B62d 53/00, B62d 53/06
[58] Field of Search...........................280/415, 423; 180/9.3; 214/138

[56] References Cited

UNITED STATES PATENTS

| | | | |
|---|---|---|---|
| 3,169,650 | 2/1965 | Soyland | 214/138 |
| 3,333,718 | 8/1967 | Durham | 280/415 X |
| 3,406,852 | 10/1968 | Winckler | 280/423 X |
| 3,460,691 | 8/1969 | Wieger et al. | 180/9.3 X |
| 3,336,041 | 8/1967 | Bouley | 280/43.23 |

FOREIGN PATENTS OR APPLICATIONS

| | | | |
|---|---|---|---|
| 458,515 | 8/1949 | Canada | 280/415 |
| 1,519,756 | 4/1968 | France | 214/138 |
| 1,003,359 | 9/1965 | Great Britain | 280/415 |

*Primary Examiner*—Leo Friaglia
*Attorney*—Newton, Hopkins & Ormsby

[57] ABSTRACT

A method of simplifying the transport of a track-laying vehicle having an implement which can be raised and lowered at its forward as well as at its rearward end, in which the implement at the forward end of the track-laying vehicle is brought into engagement with a coupling pin projecting upwardly from the floor of a towing vehicle by means of a socket or opening disposed in the bottom of the implement, and the rearward end of the track-laying vehicle is thereupon raised by depressing a wheeled axle unit against the ground, the axle unit comprising a frame or like structure on which wheels are rotatably mounted whereafter the track-laying vehicle can be towed by a truck like a trailer while on the wheels of the axle unit.

5 Claims, 4 Drawing Figures

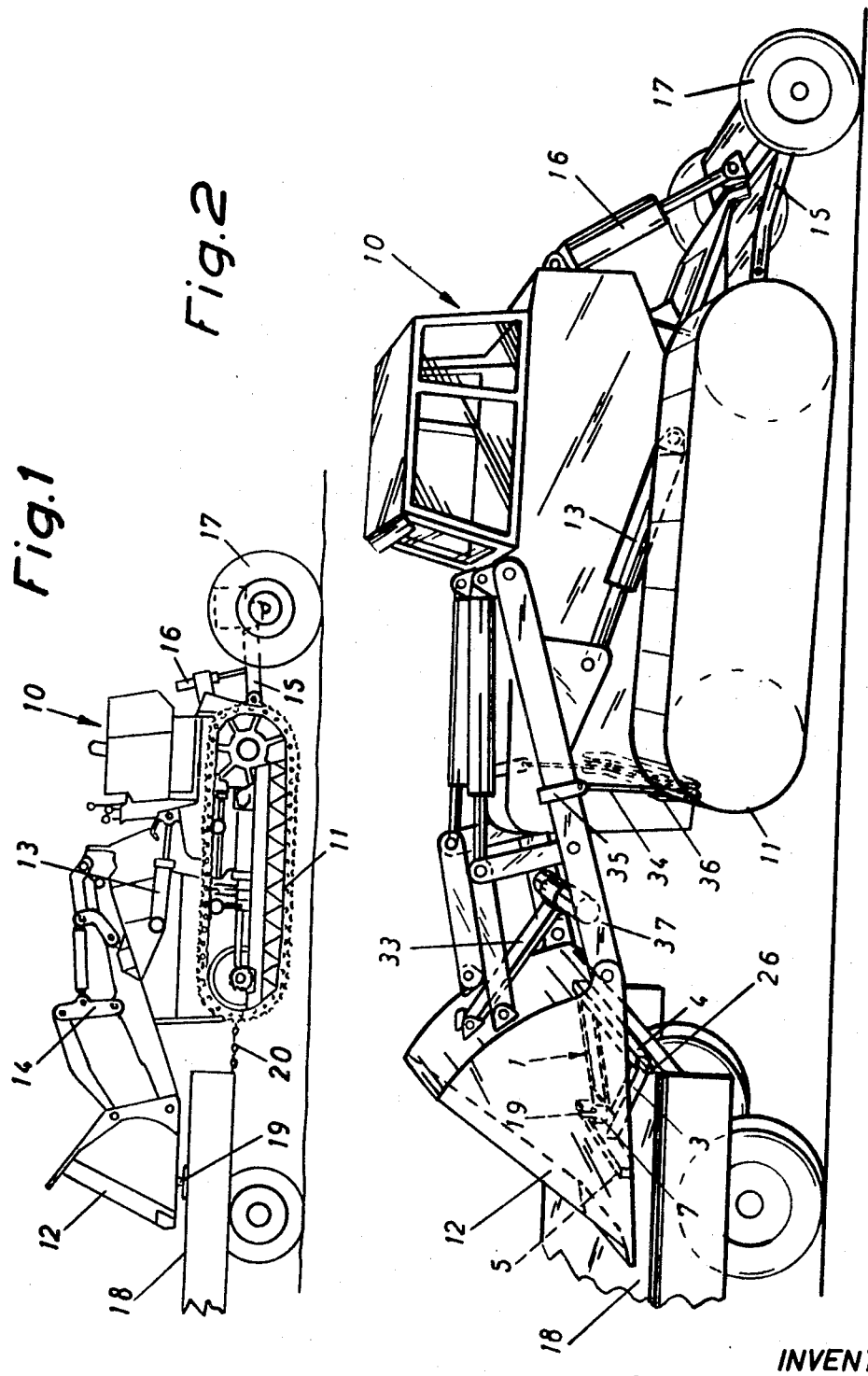

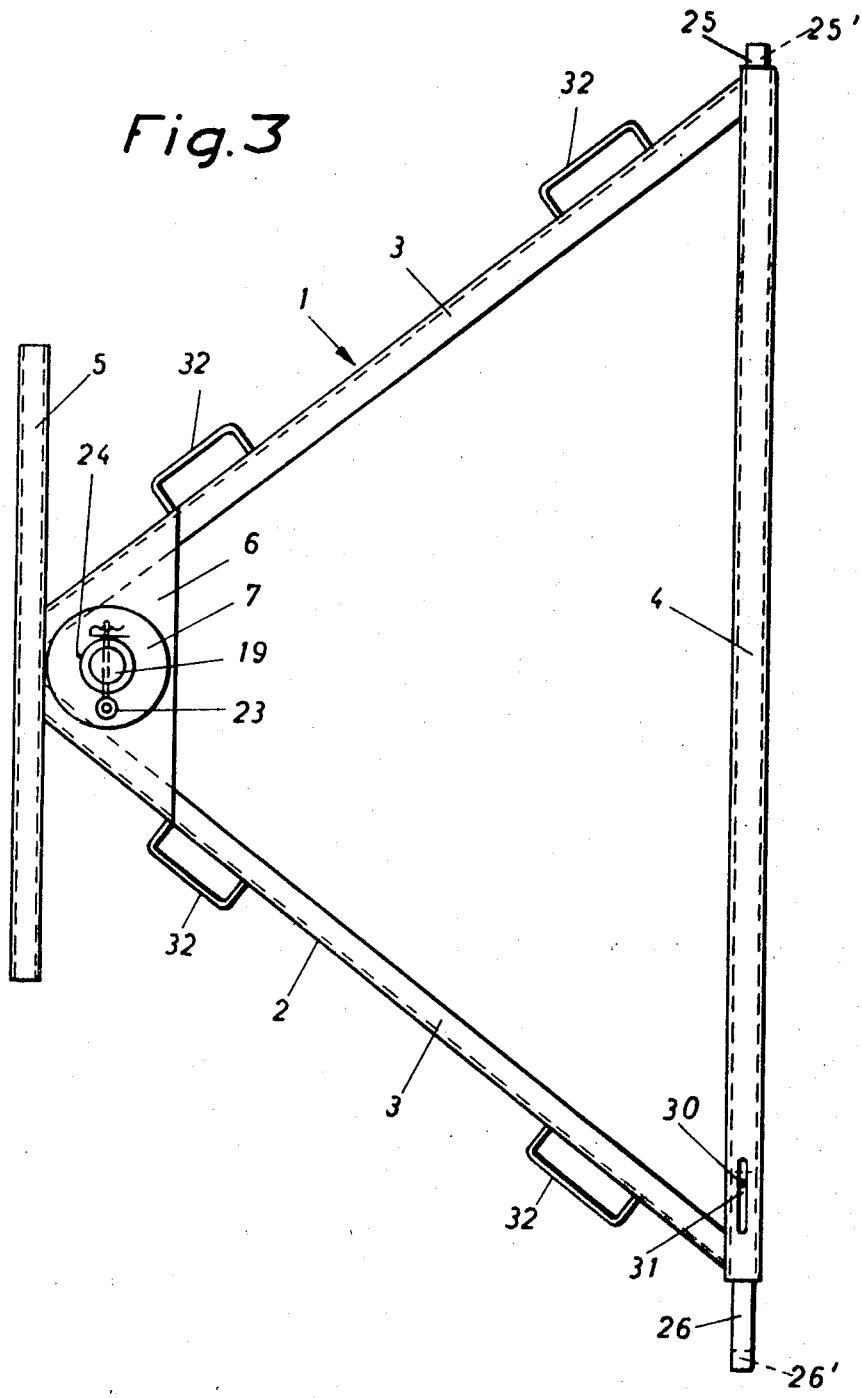

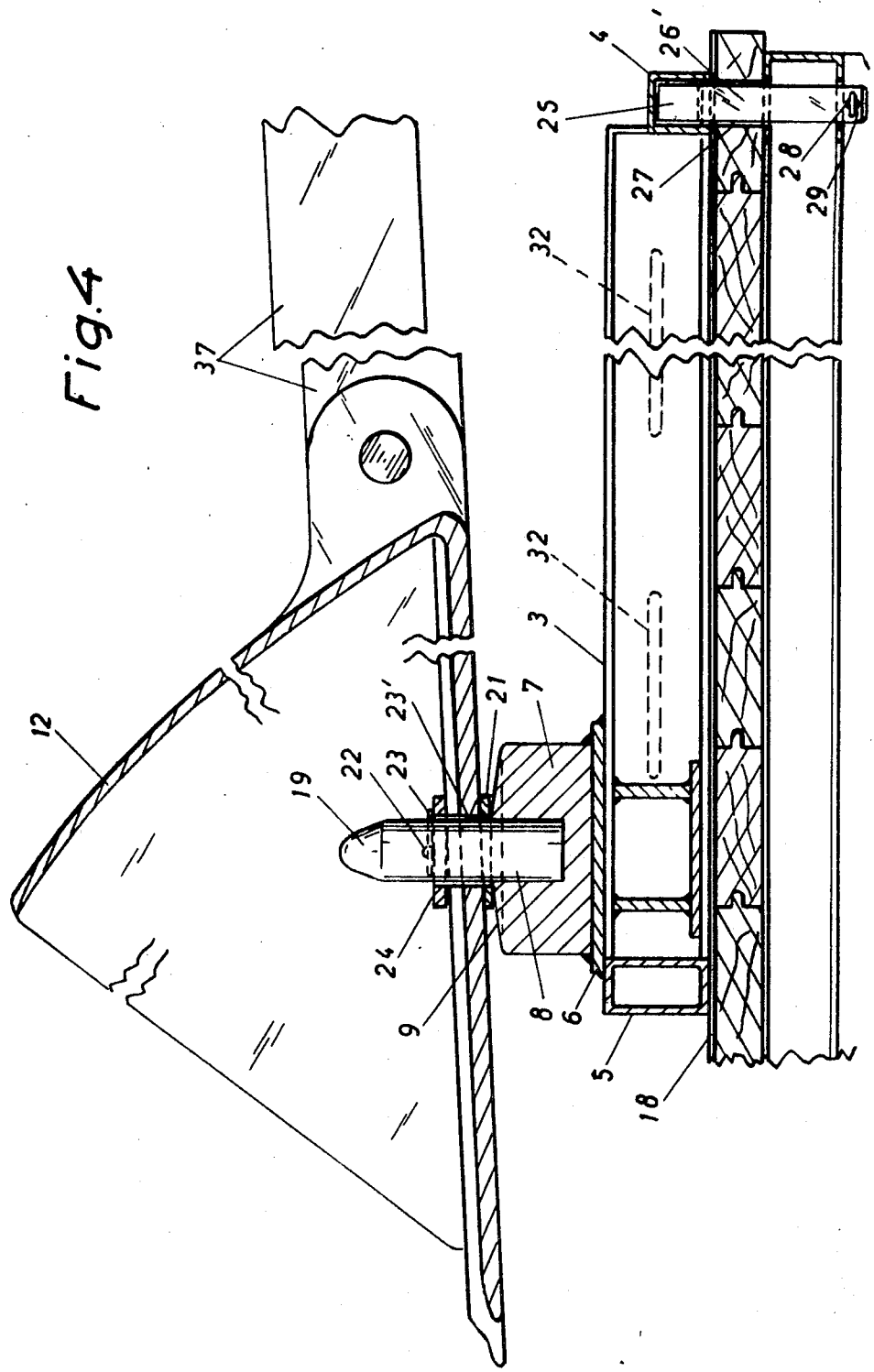

TRANSPORT OF TRACK-LAYING VEHICLES

BACKGROUND OF THE INVENTION

This invention relates to track-laying vehicles, such as tractors, bulldozers and like vehicles used mainly for constructional and public works, and is more particularly concerned with a method of and apparatus for transporting such vehicles from one site to another whereby undesirable transport on the tracks of such vehicles (which are hereinafter referred to as tractor vehicles) is avoided.

Tractor vehicles of this kind are commonly provided at least at one end thereof with a power lift carrying earth moving or like equipment. For use in constructional or public works such tractor vehicle may be provided at its forward end with a power shovel or a bucket digger or a scoop and the rear end may be provided with a scraper or a scarifier device, and the shovel, digger or scoop and the scraper or scarifier device may be actuated hydraulically independently of each other in a vertical direction.

The method used generally at present for transporting such track-laying vehicles comprising driving the vehicle upon a specially constructed low loader or transporter which is used only for the transport of such tractor vehicles. However, it has been desirable for a long time to be able to perform the transport of such tractor vehicles in a considerably simpler manner without the need for acquiring or using such specially constructed low loaders.

Another method has been proposed according to which an earth moving vehicle to be transported can be towed as a trailer attachment to a truck. In this method the tractor vehicle to be transported is raised through approximately 30° by depressing the equipment carried by the power thereof against the ground and trolley specially constructed for this purpose is attached to the raised end of the tractor vehicle. After turning the equipment thereof in a horizontal direction through approximately 180° the latter is connected to a coupling device disposed at the rear end of the truck. The other end of the tractor vehicle is thereupon raised by depressing the equipment thereof on to the floor of the truck whereby the tracks are lifted clear of the ground the tractor vehicle thus forming a trailer which can travel on the trolley. This particular method of transporting tractor vehicles is based on the fact that the power-operated equipment thereof can be rotated in a horizontal direction and involves lifting of the one end of the tractor vehicle from the ground in order that the trolley can be attached thereto; however, this method is not completely satisfactory, on the one hand from the point of view of safety, and on the other hand owing to the fact that the trolley must be connected to, and disconnected from the tractor vehicle before and after each conveyance from one building site to another.

SUMMARY OF THE INVENTION

For the purpose of simplifying the transport of a track-laying vehicle having an implement which can be raised and lowered at its forward as well as at its rearward end, the method according to the present invention proposes that the implement at the forward end of the track-laying vehicle is brought into engagement with a coupling pin projecting upwardly from the floor of a towing vehicle by means of a socket or opening disposed in the bottom of the implement, and that the rearward end of the track-laying vehicle is thereupon raised by depressing a wheeled axle unit against the ground, the axle unit comprising a frame or like structure on which wheels are rotatably mounted whereafter the track-laying vehicle can be towed by a truck like a trailer while on the wheels of the axle unit.

In contrast to the known method of transporting tractor vehicles rotatability of one of the implements thereof in a horizontal direction is not required, which has the important advantage that the track-laying vehicle can rest with its tracks on the ground while the wheel axle unit is attached to the track-laying vehicle, because the axle unit must only be run under the raised rearward implement, for example a scarifier, and this implement is then lowered into a position suitable for attaching the driving structure. Since the rear implement, in particular when the latter is a scarifier device, is used relatively rarely compared with the forward implement often constructed as digger bucket or scoop, the further advantage is obtained by the method according to the present invention that the track-laying vehicle can be driven in many cases, and as a rule in most cases, on to a working site without need for removing the axle unit because the vehicle can travel on its tracks while the driving structure together with the rearward tool is raised, without the manoeuvrability or the use of the track-laying vehicle being impeded thereby. The transport of the track-laying vehicle from one site to another can thus be effected in many cases without need for removing the axle unit. It is only necessary that the wheeled axle unit already attached is depressed against the ground by means of the hydraulic cylinder-piston device for the rear implement during the raising of the rear end of the track-laying vehicle so that this end comes to rest on the axle unit. In a case in which a track-laying vehicle is not fitted with a rear implement, the vehicle can be provided without great difficulty with a hydraulically actuable frame or the like to which the axle unit can be releasably attached.

The invention relates also to apparatus for performing this method, which apparatus is characterised in that the forward implement is provided with a socket or opening disposed in the bottom thereof, that the floor of the truck is fitted with a coupling pin which projects upwardly therefrom and which when the track-laying vehicle is coupled to the truck, engages into the opening disposed in the implement, and that an axle unit or like wheeled structure is provided which has at least two wheels.

Thus, the forward end of the track-laying vehicle is raised by depressing the forward implement upon the upwardly projecting coupling pin so that this pin is introduced into the socket or opening of the implement, the forward implement being pressed against the floor of the truck by means of the hydraulic cylinder-piston device associated therewith.

The upwardly projecting coupling pin may be rigidly attached to the chassis of the truck or, alternatively, it may be releasably disposed thereon. For example, an opening may be provided in the floor of the truck which extends through a carrier beam in the chassis of the vehicle, in which case the upwardly projecting coupling pin can be releasably disposed in this opening. A further suitable embodiment is a coupling device which is releasably attachable to the floor of the truck and which is in the form of a portable structure which is provided on the one hand with the coupling pin intended for engagement with the socket or opening of the forward implement, and on the other hand with two holding means which are disposed at a mutual spacing corresponding substantially to the width of the floor of the truck and which extend in the operative position through holes provided at the rearward end of the floor of the truck. By means of this coupling device, any conventional truck can serve without any modification thereof as towing vehicle for the purpose of transporting a track-laying vehicle in accordance with the method referred to above. The coupling device can be attached simply and within a very short period of time to the floor of the truck. The one holding means of this device is preferably arranged to be displaceable relatively to the other holding means which is then stationary whereby an adjustment in accordance with the width of the respective truck floor can be effected.

BRIEF DESCRIPTION OF THE DRAWINGS

FIG. 1 is a side view of the rearward end of a truck with a track-laying vehicle coupled thereto like a trailer, FIG. 2 illustrates in perspective view on an enlarged scale, a similar track-laying vehicle in the transport position, using a coupling device, FIG. 3 is a plan view of the coupling device, and FIG. 4 is a vertical section through the coupling device, the forward implement mounted thereon and the rearward part of the truck floor.

DETAILED DESCRIPTION OF THE INVENTION

A track-laying vehicle 10 illustrated in the drawing is an earth moving track-laying vehicle which is provided with tracks 11 and which is fitted at its forward end with a digger bucket 12 which is adapted to be raised and lowered by means of a lift comprising hydraulic cylinder-piston devices 13 on both sides of the track-laying vehicle and moved pivotally by a lever and link control system 14; at its rearward end the vehicle is fitted with a second hydraulic lift comprising a scarifier 15, which can be raised and lowered by means of a hydraulic cylinder-piston device 16.

The method of transporting this tractor vehicle is performed according to the invention in such manner that an auxiliary axle unit including two wheels 17 which are provided with pneumatic tyres and which are connected to each other by a shaft, is attached to the scarifier, while the track-laying vehicle 10 is supported by its tracks 11 on the ground when the vehicle is to be transported. The axle unit is run under the raised scarifier and is then attached thereto after the scarifier has been lowered into a position suitable for this purpose. Thereafter the axle unit can be lifted off the ground by the scarifier 15, whereupon the track-laying vehicle is moved on its tracks behind the floor 18 of a truck, the bucket 12 being in its raised position. However, a condition for performing the method is that the truck floor is provided with a coupling pin 19 projecting upwardly therefrom and that the bucket 12 has a socket or opening 23' corresponding to this coupling pin. The bucket 12 is then lowered onto the floor 18 and the coupling pin 19 is inserted into the socket opening of the bucket. The bucket 12 and the wheeled axle unit are thereupon depressed on to the truck floor 18 and the ground respectively by means of the respective hydraulic cylinder-piston devices 13 and 16, this being effected either simultaneously or successively, so that the tracks 11 are raised off the ground and the tractor vehicle assumes the form of a trailer which is coupled to the truck and which rolls on the wheels of the axle unit, being pivotal about the coupling pin 19 in a horizontal direction. For safety reasons a chain 20, may be connected between the truck and the track-laying vehicle coupled thereto which ensures that the track-laying vehicle cannot be pulled away from the towing vehicle during its transport. A further or alternative safety device involving a pin 23 is described below with reference to FIGS. 3 and 4.

In FIG. 2, the track-laying vehicle 10 is illustrated in a position raised for transport by means of its forward implement, in the present example the bucket 12, the hydraulic cylinder-piston devices 13 associated therewith and the control system 14, as well as by means of its rear implement, in the present example a scarifier 15, and the axle unit 17 attached thereto. In this case, the bucket 12 rests on a coupling device which is disposed on the floor 18 of a truck, whereas the axle unit is pivoted down and the wheels thereof rest on the ground, so that the tracks 11 of the track-laying vehicle are freely suspended in the air.

The construction of the coupling device 1 in accordance with a preferred embodiment of the invention may be seen from FIGS. 3 and 4. The coupling device which is in the form of a portable frame, has the shape of an isosceles triangle the two limbs 3 of which consist of carrier members of U-shaped cross-section e.g. of steel, and the base 4 of which consists of a box carrier of square or rectangular cross-section. The two U-shaped carrier members 3 converge in the forward direction and are preferably securely welded to a carrier beam 5 which is also in the form of a box carrier. At the corner formed thereby, there is disposed a plate 6 which is securely welded to the carrier members 3 and 5 and which is provided with a base member or plinth 7 consisting of steel. The plinth 7 is provided with a central vertical perforation 8 into which an upwardly projecting coupling pin 19 is inserted with press fit. The coupling pin 19 consists preferably of a steel alloy, e.g. chrome-nickel steel. The surface 9 of the plinth 7 is slightly conical or hemispherical in order that during the transport of the track-laying vehicle, rotary movements of the bucket 12 are possible, which is of great importance because the transport must frequently be effected over uneven ground. For the purpose of reducing friction, a ring 21 preferably consisting of a soft metal is pushed upon the coupling pin 19. The coupling pin 19 is furthermore provided with a transverse perforation 22 into which a locking pin 23 can be inserted. Moreover, between the pin 23 and the bucket 12 through the opening 23' of which latter the coupling pin 19 extends, a further ring 24 may be provided. By means of this arrangement, any risk that the bucket 12 is displaced from its position and "uncoupled" during the transport of the track-laying vehicle over uneven ground is avoided.

The box carrier forming the base 4 of the triangular coupling device 1 is provided at each of its two ends with a holding means 25 and 26. These holding means consist of square or rectangular section bars which are inserted into the open ends of the box carrier 4, each having an arm 25', 26' which is directed downwardly at a right angle under the horizontal plane defined by the underside of the coupling device 1. In the operative position of the coupling device the arms extend through holes 27 located at the rear end of the truck floor 18. Such holes 27 which serve for receiving vertical posts or like supports are present on nearly any truck of conventional type. The downwardly directed arm 25', 26' of each of the holding means 25, 26 is provided with a transverse perforation 28 into which a locking pin 29 is inserted. The one holding means 25 is rigidly welded to one end of the box carrier 4, whereas the other holding means 26 is displaceable in the interior of this box carrier. A pin 30 which is rigidly fixed to the holding means 26 runs in a slot 31 disposed in the box carrier 4 and prevents the holding means from inadvertently sliding out of the box carrier. The spacing between the two arms 25', 26' of the holding means 25, 26 can thereby be changed to allow for varying spacings between the holes 27 disposed at the rear end of the truck floor 18, i.e. for varying widths of the floor. All sliding surfaces may be lubricated by means of graphite or other lubricant.

For facilitating the handling of the coupling device 1, hand grips 32 are disposed at the limbs 3 thereof, whereby the device 1 can be easily carried by two persons. However, the coupling device 1 is not so heavy that it could not be lifted in an emergency by a single person.

For reducing the load on the hydraulic cylinder-piston devices of the track-laying vehicle 10, the latter may be provided with a plurality of relief supports such as illustrated by way of example in FIG. 2, for example with a support member 33 for reducing the load on the forward hydraulic cylinder-piston device 13, a cable 34 with fixing means 35 and guides 36 for reducing the load as the hydraulic cylinder-piston devices for the lifting means 37 of the bucket 12, and a load-reducing support member 38, for the rear hydraulic cylinder-piston device 16, which actuates the rear implement, in the present example the scarifier 15, and thus also the wheeled axle unit. In another track-laying vehicle the scarifier 15 may be replaced by some other implement. Moreover, the rear implement may be completely omitted, in which case, however, the track-laying vehicle must be provided with a hydraulic lifting device, or with fixing means for attaching such hydraulic lifting device, to which the axle unit can be attached preferably in a releasable manner.

The embodiment of the invention described above must be regarded only as examples and can be modified in various ways within the scope of the following claims. For example the portable frame constituting the coupling device may be shaped differently, in which case also other types of carrier members and beams can be used.

Finally, the coupling pin 19 may be disposed on the portable frame 1 in a different manner.

The method of the present invention is suitable also for other trackelaying vehicles than referred to above.

What I claim is:

1. Apparatus for transporting a track-laying vehicle wherein the improvement comprises a track-laying vehicle, tracks mounted on said vehicle, a hydraulically displaceable implement fitted to one end of said vehicle, hydraulically displaceable means for supporting a wheeled unit fitted to the other end of said vehicle, said wheeled unit including at least two road wheels, said implement provided with a socket opening therein, a towing vehicle for towing said track-laying vehicle, a coupling pin upstanding from the rear end of said towing vehicle, said coupling pin being engageable in said socket opening when said implement is lowered onto the rear end of said towing vehicle, said wheeled unit being adapted to be depressed to raise said tracks off the ground, whereby said track-laying vehicle can be towed behind said towing vehicle like a trailer, said apparatus further comprising a removable coupling device which can be attached to the floor of the towing vehicle and which is in the form of a portable structure which is provided on the one hand with the said upstanding coupling pin and on the other hand with two holding means which are disposed at a mutual spacing corresponding substantially to the width of the floor of the towing vehicle and which extend in the operative position through holes present in the rear end of the said floor, said coupling device having the shape of an isosceles triangle with the coupling pin projecting upwardly therefrom and the two holding means being disposed each in one corner of this triangle.

2. Apparatus for transporting a track-laying vehicle wherein the improvement comprises a track-laying vehicle, tracks mounted on said vehicle, a hydraulically displaceable implement fitted to one end of said vehicle, hydraulically displaceable means for supporting a wheeled unit fitted to the other end of said vehicle, said wheeled unit including at least two road wheels, said implement provided with a socket opening therein, a towing vehicle for towing said track-laying vehicle, a coupling pin upstanding from the rear end of said towing vehicle, said coupling pin being engageable in said socket opening when said implement is lowered onto the rear end of said towing vehicle, said wheeled unit being adapted to be depressed to raise said tracks off the ground, whereby said track-laying vehicle can be towed behind said towing vehicle like a trailer, said apparatus further comprising a removable coupling device which can be attached to the floor of the towing vehicle and which is in the form of a portable structure which is provided on the one hand with the said upstanding coupling pin and on the other hand with two holding means which are disposed at a mutual spacing corresponding substantially to the width of the floor of the towing vehicle and which extend in the operative position through holes present in the rear end of the said floor, said coupling comprising a pin that is disposed in a plinth which forms part of the coupling device and being provided with a rounded convex surface.

3. Apparatus as in claim 2 further comprising a ring that is releasably disposed on the coupling pin and rests on the surface of the plinth.

4. Apparatus as in claim 3 further comprising a pin disposed in a transverse perforation in the coupling pin and a second ring releasably disposed on the coupling pin.

5. Apparatus for transporting a track-laying vehicle wherein the improvement comprises a track-laying vehicle, tracks mounted on said vehicle, and hydraulically displaceable implement fitted to one end of said vehicle, hydraulically displaceable means for supporting a wheeled unit fitted to the other end of said vehicle, said wheeled unit including at least two road wheels, said implement provided with a socket opening therein, a towing vehicle for towing said track-laying vehicle, a coupling pin upstanding from the rear end of said towing vehicle, said coupling pin being engageable in said socket opening when said implement is lowered onto the rear end of said towing vehicle, said wheeled unit being adapted to be depressed to raise said tracks off the ground, whereby said track-laying vehicle can be towed behind said towing vehicle like a trailer, said apparatus further comprising a removable coupling device which can be attached to the floor of the towing vehicle and which is in the form of a portable structure which is provided on the one hand with the said upstanding coupling pin and on the other hand with two holding means which are disposed at a mutual spacing corresponding substantially to the width of the floor of the towing vehicle and which extend in the operative position through holes present in the rear end of the said floor, and in which one of said holding means is displaceable relative to the other holding means for the purpose of changing the mutual spacing.

* * * * *